May 26, 1931.   B. BURNS ET AL   1,806,738
CHEMICO THERMAL WELDING PROCESS
Filed Jan. 2, 1929

INVENTORS:
BRUCE BURNS,
HOWARD B. LEWIS,
RUSSEL M. OTIS,
By Fad N Davis
ATTORNEY.

Patented May 26, 1931

1,806,738

UNITED STATES PATENT OFFICE

BRUCE BURNS AND HOWARD B. LEWIS, OF LOS ANGELES, AND RUSSELL M. OTIS, OF ALHAMBRA, CALIFORNIA, ASSIGNORS TO HUGHES DEVELOPMENT COMPANY, LTD., OF LOS ANGELES, CALIFORNIA, A CORPORATION OF DELAWARE

CHEMICO-THERMAL WELDING PROCESS

Application filed January 2, 1929. Serial No. 329,801.

This invention relates to a chemico-thermal welding process and it has for its primary object the provision of a process by means of which it is possible to weld together metallic objections, without the employment of a welding torch or other similar flame producing means.

Another object is to provide a process by means of which it is possible to weld together very delicate metallic objects or objects of such thinness as to be incapable of withstanding the direct application of a welding flame.

Another object is to provide a process adaptable for use in the welding together of a multiplicity of prefabricated parts of a composite metallic unit in which the several component parts are of such intricate configuration and so closely intermeshed as to preclude the use of any welding flame or any mechanical welding means.

A further object is to provide a process adapted not only to produce a weld at the point or points of contact of the objects to be welded, but also to produce a change in the qualities of the welded metals.

It is believed that the above objects may best be fulfilled by the employment of what may be termed a "vapor process of welding", and it is therefore a major object of the present invention to provide a chemico-thermal welding process in which the welding is accomplished by a decomposition of a vapor of a volatile compound of the welding metal, metal alloy or metalloid, the deposition of the metallic radical of said compound upon the metal or metal alloy to be welded, and the alloying of said deposited metallic radical with the metal or metal alloy to be welded.

Our process and the theory upon which we believe it to be based may be illustrated by a description of a specific case dealing with the manufacture of a foraminated plate or grid structure, such specific description in connection with the accompanying drawing being used only as illustrative of one example of the employment of our process.

Of the drawings:

Fig. 1 is an enlarged plan view of a plate or grid structure above referred to.

Figure 1:
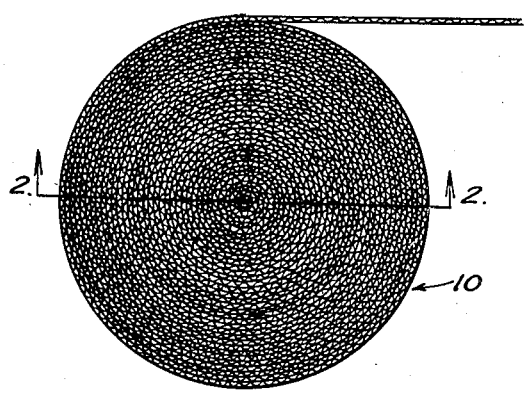
Figure 1:
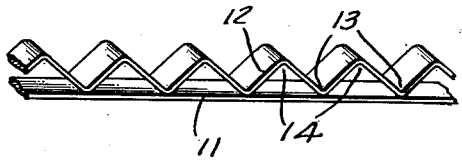
Figure 2:
Fig. 2 is a cross-section taken as indicated by the line 2—2 of Fig. 1.
Figure 3:
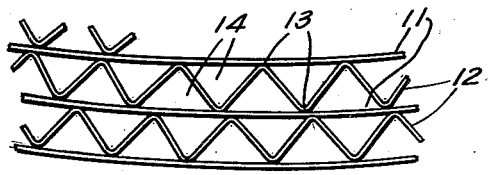
Fig. 3 is a greatly enlarged fragmentary section showing the pieces in assembled position but before they are welded.

The structure 10 illustrated in the drawing is a composite pre-fabricated metallic foraminated plate or grid unit formed of two ribbon like strips of metal spirally wound together in clock-spring fashion, the one ribbon or strip 11 being flat and the other ribbon or strip 12 being transversely corrugated or crimped. The plate, therefore, consists of alternate convolutions or layers of corrugated and flat strips arranged to contact each other at the crests or bends of the corrugated strip, as indicated at 13 in Fig. 3, the strips thus defining intermediate openings 14 of substantially triangular cross-section.

In one specific example these strips were formed of white nickel and were one-fourth of an inch wide and less than three thousandths of an inch thick and the strip 12 was corrugated in such a manner that the structure contained approximately 2500 of the holes or openings 14 to the square inch of plate surface. This structure, of which about 70% of its area was voids, was lacking in strength and stability and it became necessary that some means be employed to weld or form a molecular union between the ribbons at their multitudinous points of contact. It was readily realized that while it may have been theoretically possible to weld the ribbons at each individual point of contact, as they were wound together, in practice such a procedure would not only be prohibitive in cost, but also exceedingly difficult if not impossible of accomplishment with the ordinary welding methods and without burning the exceedingly thin nickel ribbons by the direct action of a welding flame.

To weld the ribbons after being wound together, by the use of a welding flame, would also be prohibitive for the same reasons and also would be impossible since a welding flame could not be projected into the very fine openings 14 which are small enough to extinguish any flame.

Figure 4:
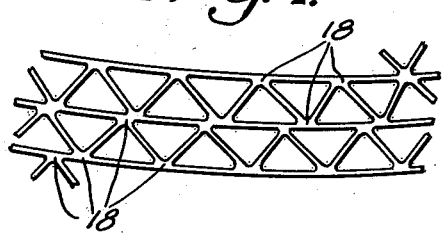
Fig. 4 is a similar fragmentary section showing a portion of the welded structure.

These considerations led to the employment of the present process which not only forms a perfect welding bond between the two ribbons (as indicated at 18 in Fig. 4), but also effects a change in the quality of the ribbons; that is, in the example now being described in which iron is used as the welding metal, the iron combines with the nickel to change the nickel ribbons to an iron nickel alloy of great tensile strength, thus greatly increasing the strength and stability of the structure.

Figure 5:
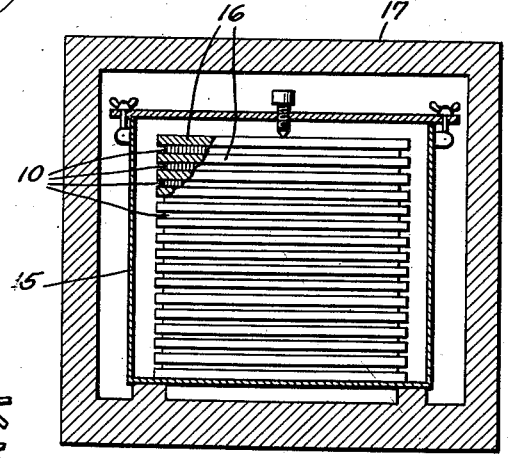
Fig. 5 is an elevational view illustrating a step in the process.

As illustrated in Fig. 5, one or more of the plates or grid units 10 are placed in a closed container or bomb 15 between plates 16 of iron which have been pickled. By "pickled" we mean steeped in an acid bath, and in the present example we have found it satisfactory to prepare the plates 16 by placing them in a dilute hydrochloric acid solution of about 20% for approximately six hours. The bomb containing the grid units 10 and the pickled plates 16 is then placed in a furnace, indicated by the numeral 17, where it is subjected to a high temperature. We have found that a temperature in excess of 1500° is suitable but that a higher temperature may be used. In actual practice the temperature of 1600° F. may be maintained for a duration of forty-two hours. If a lower temperature is used, which is possible, the duration of time is made longer, and if a higher temperature is used, the duration of time is shortened.

This heat treatment has the effect of molecularly welding or uniting the nickel strips together at each point of contact and of alloying the welding metal with that of the ribbons to change the nickel ribbons to ribbons of iron nickel alloy. The result of this process is to produce a homogeneous foraminated unit of maximum strength and stability and having great heat resisting qualities.

While we are able to advance certain theories which we believe will explain the action which takes place within the bomb or during the carrying out of the process, it is to be understood that we are not certain of the accuracy thereof, therefore, without any desire to limit ourselves and at the same time disclaiming any inaccuracies of our explanation which may later come to light, we offer an explanation of what we believe to occur.

When the iron plate is subjected to the acid bath, the hydrochloric acid reacts with the iron of the plate to form ferric chloride. The part of the iron which dissolves in the acid to form the ferric chloride is generally that between the fibres of the iron, and after the pickling the iron plate therefore has a porous appearance. Now, on heating the plate together with the nickel ribbons in an enclosure to a high temperature, the ferric chloride, which has been formed between the iron fibres in the iron plate, is vaporized and fills the enclosure. The ferric chloride, in the presence of the nickel ribbons and under the influence of the tendency of iron to enter into solid solution with the nickel at this temperature, decomposes and deposits iron on the nickel ribbons, the chlorine being set free.

The deposited iron goes into solid solution, forming with the nickel an iron nickel alloy, and the freed chlorine returns and unites with some of the remaining iron of the iron plate, again forming ferrous chloride which passes over to the nickel ribbons, decomposes, and deposits more iron, at the same time freeing the chlorine. This may suggest the question of why the free chlorine does not attack the iron which has been deposited as easily as it attacks the iron of the plate. Broadly, the explanation of this seems to be that the iron is held by the nickel in solid solution more firmly than the iron is held to itself in the plate. As will later be explained, our experiments tend to support a theory that this preferential affinity of one material for certain other materials is dependent upon the relative atomic volumes of the materials and probably in many instances also upon the type of their crystal structure.

It has been found that iron can be employed as the welding material only with metals where this preferential affinity predominates in favor of the metals to be welded. For example, iron cannot be deposited on iron, and this is particularly noticeable in the iron welding of nickel ribbons where after about one hour almost the same amount of iron is deposited as after many hours of heating. The reason for this is that the iron which is first deposited goes into solid solution, but gradually changes the exterior of the ribbons to more nearly pure iron than pure nickel, until finally almost a pure iron surface is presented to the ferric chloride. When this situation arises, no more iron will be deposited until the iron which has already been deposited penetrates farther into the nickel, causing the exterior of the ribbons to again be more nearly a nickel iron alloy. More iron will then be deposited.

The same action can be made to take place by placing in the bomb with the nickel ribbon, instead of an iron plate, some iron, preferably powdered, and a small amount of ammonium chloride, or, in fact, any of many halogen compounds. Taking the case of iron powder and ammonium chloride, the action is as follows: the ammonium chloride, at a comparatively low temperature, decomposes, forming nitrogen, hydrogen and chlorine. The nitrogen plays no part in the reaction. The hydrogen acts as a reducing agent, keeping the ribbon clean and unoxidized. The chlorine unites with the iron to form ferrous chloride, which is a vapor at the temperature which is employed. This ferrous chloride decomposes near the surface of the nickel ribbon, depositing iron and freeing the chlorine to go back and unite with more iron. The process continues until an amount of iron is deposited which is entirely independent of the amount of iron put into the bomb originally; that is, the process is not affected by iron which may be in the bomb in excess of the iron actually deposited upon the ribbons; and independent, also, of the amount of chlorine up to the point where all the chlorine may be exhausted through leakage or adsorption.

The amount of iron which is deposited is solely dependent upon the nature of the surface on which the deposition takes place, and on the temperature and length of time during which the progress is continued. The higher the temperature and longer the time, the farther into the nickel does the iron penetrate, and therefore the more nearly is the surface of the ribbon a nickel surface; hence, the more will be the iron deposited.

The process can also be carried into effect by placing a ribbon to be welded and a small amount of ferric chloride or ferrous chloride in an air-tight enclosure, and heating as before. Here the action is identical with the exception that after the iron chloride has decomposed, there is no more iron for the freed chlorine to unite with. This is an unfavorable situation as regards welding of thin sheets, because it appears that the chlorine which is freed builds up a pressure great enough to cause considerable absorption of the chlorine by the metal to be welded. If this metal is thin, the result is a decided embrittling effect, so that in some cases the metal can be powdered between the fingers. This shows the advantage which attaches to the method of welding in which only a small amount of chlorine is present and in which that small amount is used over and over again, so that there is never a high pressure of chlorine in the enclosure.

The process can also be carried out using ammonium bromide, ammonium iodide, ammonium fluoride, or many other compounds containing a halogen. It is advantageous, however, to use the ammonium compounds inasmuch as hydrogen is one of the products of dissociation, and the work is then kept clean in the process. This is particularly advisable when dealing with nichrome or any of the chromium alloy ribbons, because even the small amount of oxygen which is in the enclosure originally will cause oxidation of the chromium, and this makes impossible a good bond between ribbons.

While the specific example, which is above described in detail, deals with the welding of nickel or nickel alloy ribbons with iron, it is to be understood that we do not wish to be limited in this regard since such example is merely intended as an illustration of one application of the broad process of the present invention, which is intended to include the employment of all substances capable of use in the process to accomplish the desired results.

In actual practice we have found that metals of high atomic volume will deposit on any metal of lower atomic volume but that those of lower atomic value will not deposit on metals of higher atomic volume. Thus, we find that iron (atomic volume 7.1), if placed in a totally enclosed bomb with nickel (atomic volume 6.7) and suitable chemicals, will deposit on the nickel, but nickel will not deposit on iron since iron has a higher atomic volume than nickel.

We have further found that nickel (atomic volume 6.7) will not deposit on cobalt (6.8), copper (7.15), manganese (7.4), chromium (7.5), zinc (9.1), magnesium (14.0), or tin (16.3), but that any one of these will deposit on nickel which is of lower atomic volume. Also we have found that cobalt (6.8) will not deposit on iron (7.1), copper (7.15), or chromium (7.5); that iron (7.1) will not deposit on manganese (7.4), chromium (7.5), zinc (9.1), magnesium (14.0), or tin (16.3), while it will readily deposit on cobalt (6.8); and that copper (7.15) will not deposit on chromium (7.5), zinc (9.1), magnesium (14.0), or tin (16.3), while it will readily deposit on cobalt (6.8). We have been successful also in depositing manganese (7.4) on iron (7.1) or nickel (6.7); chromium (7.5) on copper (7.15), iron (7.1), cobalt (6.8), or on nickel (6.7); zinc (9.1) on copper (7.15), iron (7.1), or on nickel (6.7); magnesium (14.0) on copper (7.15), iron (7.1), or nickel (6.7); and tin (16.3) on copper (7.15), iron (7.1), or nickel (6.7).

While these experiments are not exhaustive, they appear to verify a theory generally applicable to all metals and metalloids which may be employed in our process, such theory being that a metal will deposit on another metal when the attraction of the atoms of the depositing metal to the atoms of the metal on which the deposit is made is stronger than the attraction of the atoms of the depositing metal to themslueves.

It is generally admitted in metallurgical theory that the attraction between atoms of high atomic volume and atoms of low atomic volume is greater than the attraction between two atoms both of high atomic volume. Therefore it follows that atoms of high atomic volume should prefer to deposit and stay on atoms of lower atomic volume rather than to stay with atoms of the same or higher atomic volume. The theory is thus shown to agree with the results which we have obtained in actual practice.

This law seems to apply generally to all metals, and it appears to be that the greater the difference in atomic volumes of two metals, the greater is the deposition of the metal of higher atomic volume on the metal of lower atomic volume. However, the amount of deposition is not always proportional to the difference in atomic volume between two metals. This is due to a number of uncertain factors, but at least one factor is probably the relative crystal structures of the metals. It is probable that if the two metals have the same type of crystal structure, the deposition will be greater than if the metals have different crystal structures. Thus, if a metal has a body-centered hexagonal crystal structure, it will not deposit so easily on a metal having a face-centered hexagonal crystal structure as it will on another with body-centered crystal structure, even though the metal of unlike crystal structure has a much different atomic volume.

We have also obtained highly satisfactory results by the employment of phosphorous and chromium, in which instance chromium phosphide is formed and vaporized, the vaporized compound being decomposed to deposit its chromium radical which goes into solid solution to alloy with the metal to be welded, and the phosphorous being freed to return and unite again with more chromium in a repetition of the cycle. We have, in the same manner, employed arsenic and chromium, in which instance chromium arsenide is formed and vaporized and decomposes to deposit the chromium, the freed arsenic returning to again combine with more chromium.

From the above it will be apparent that the process which we have evolved depends upon the decomposition of the vaporized metal or metalloid compound employed and the deposition upon the metals to be welded of the metallic radical of said compound, without interchange of metallic atoms between the welding metal and the metal to be welded, and with a complete release of the non-metallic radical of said compound, whereby said released non-metallic radical may again combine with the supply of welding material to form more of the volatile metal or metalloid compound, in a repetition of the cycle.

The freed radical of the vaporized compound thus acts as a one-way conveyor; that is, it conveys the welding material to the metals to be welded where through the decomposition it is freed, and since the decomposition and deposition do not involve an interchange of metallic atoms, it follows that the released non-metallic radical returns in a free state to the supply of welding material and does not during such return convey atoms of the welded metals.

While the process as herein illustrated and described is fully capable of accomplishing the objects primarily stated and while the theory set forth is thought to be a correct explanation of the actions which take place in the operation of the process and of the natural laws which render the process operable, it is to be understood that we do not wish to be in any manner restricted beyond the actual process which we have invented, and which is embodied in the scope of the claims which follow.

We claim as our invention:

1. A chemico-thermal vapor process of welding together substantially contacting metallic objects, which comprises: heating said objects in an enclosure containing a compound of a welding metal or metalloid, to such temperature that said compound is vaporized and the vaporized compound is decomposed to deposit its metallic radical upon said objects and free its non-metallic radical, said deposited metallic radical going into solid solution to alloy with said objects and form the weld.

2. A chemico-thermal vapor process of welding together substantially contacting metallic objects, which comprises: heating said objects in an enclosure containing a halogen compound of a welding metal or metalloid, to such temperature that said compound is vaporized and the vaporized compound is decomposed to deposit its metallic radical upon said objects and free its halogen radical, said deposited metallic radical going into solid solution to alloy with said objects and form the weld.

3. A chemico-thermal vapor process of welding together substantially contacting metallic objects, which comprises: subjecting a compound of a welding metal or metalloid to the decomposing effects of heat; and heating said objects in the presence of the vapor of said compound, to cause the metallic radical thereof to be deposited upon said objects and go into solid solution therein to form the weld.

4. A chemico-thermal vapor process of welding together substantially contacting metallic objects, which comprises: placing said objects in an enclosure together with a supply of a welding metal or metalloid, and a halogen; heating said enclosure to effect formation of a vaporized metallic halide; and raising the temperature sufficiently to cause decomposition of the vaporized halide and deposition of its metallic radical upon said objects, whereby said metallic radical goes into solid solution to alloy with said objects and form the weld and the halogen is free to return and again combine with the welding metal or metalloid to form more of said metallic halide in a repetition of the cycle.

5. A chemico-thermal vapor process of welding together substantially contacting metallic objects, which comprises: placing said objects in an enclosure together with a supply of a welding metal or metalloid, and a halogen compound; heating said enclosure to effect formation of a vaporized metallic halide; and raising the temperature sufficiently to cause decomposition of the vaporized halide and deposition of its metallic radical upon said objects, whereby said metallic radical goes into solid solution to alloy with said objects and form the weld and the halogen is freed to return and again combine with the welding metal or metalloid to form more of said metallic halide in a repetition of the cycle.

6. A chemico-thermal vapor process of welding together substantially contacting metallic objects, which comprises: placing said objects in an enclosure together with a supply of a welding metal or metalloid, and a relatively small quantity of a halogen; heating said enclosure to effect formation of a vaporized metallic halide; and raising the temperature sufficiently to cause decomposition of the vaporized halide and deposition of its metallic radical upon said objects, whereby said metallic radical goes into solid solution to alloy with said objects and form the weld and the halogen is freed to return and again combine with the welding metal or metalloid to form more of said metallic halide, the initial quantity of halogen being thus reemployed in repetitions of the cycle.

7. A chemico-thermal vapor process of welding together substantially contacting metallic objects, which comprises: placing said objects in an enclosure together with a supply of a welding metal or metalloid, and a relatively small quantity of a halogen compound; heating said enclosure to effect formation of a vaporized metallic halide; and raising the temperature sufficiently to cause decomposition of the vaporized halide and deposition of its metallic radical upon said objects, whereby said metallic radical goes into solid solution to alloy with said objects and form the weld and the halogen is freed to return and again combine with the welding metal or metalloid to form more of said metallic halide, the initial quantity of halogen being thus reemployed in repetitions of the cycle.

8. A chemico-thermal vapor process of welding together substantially contacting metallic objects, which comprises: placing said objects in an enclosure together with a supply of a welding metal or metalloid, and a substance capable of forming with said welding metal or metalloid, a volatile metallic compound; heating said enclosure to vaporize said compound; and raising the temperature sufficiently to cause decomposition of the vaporized compound and deposition of its metallic radical upon said objects, whereby said metallic radical goes into solid solution to alloy with said objects and form the weld and the non-metallic radical of said vaporized compound is freed to return and again combine with the welding metal or metalloid to form more of said compound in a repetition of the cycle.

9. A chemico-thermal vapor process of welding together substantially contacting metallic objects, which comprises: placing said objects in an enclosure together with a supply of a welding metal or metalloid, and a relatively small quantity of a substance capable of forming with said welding metal or metalloid, a volatile metallic compound; heating said enclosure to vaporize said compound; and raising the temperature sufficiently to cause decomposition of the vaporized compound and deposition of its metallic radical upon said objects, whereby said metallic radical goes into solid solution to alloy with said objects and form the weld and the non-metallic radical of said vaporized compound is freed to return and again combine with the welding metal or metalloid to form more of said compound, the initial quantity of said non-metallic radical being thus reemployed in repetitions of the cycle.

10. A chemico-thermal vapor process of welding together substantially contacting metallic objects, which comprises: treating a welding metal or metalloid with an acid capable of combining therewith to form a vaporizable compound; and heating said objects and said treated welding metal or metalloid in an enclosure, to such temperature that said compound is vaporized and the vaporized compound is decomposed to deposit its metallic radical upon said objects and free its non-metallic radical, said deposited metallic radical going into solid solution to alloy with said objects and form the weld.

11. A chemico-thermal vapor process of welding together substantially contacting metallic objects, which comprises: treating a welding metal or metalloid with a substance capable of combining therewith to form a metallic chloride compound; and heating said objects and said treated welding metal or metalloid in an enclosure, to such temperature that said compound is vaporized and the vaporized compound is decomposed to deposit its metallic radical upon said objects and free the chlorine, said deposited metallic radical going into solid solution to alloy with said objects and form the weld.

12. A chemico-thermal vapor process of welding nickel or nickel-alloy objects together, with a welding metal or metalloid of higher atomic volume, which comprises: placing said objects and said welding metal or metalloid in an enclosure, together with a substance capable of forming with said welding metal or metalloid, a volatile metallic compound; and heating said enclosure to vaporize said compound and to decompose the vaporized compound, whereby the metallic radical of said compound is deposited upon said objects and its non-metallic radical is freed, said deposited metallic radical going into solid solution to alloy with the nickel or nickel-alloy of said objects and form the weld.

13. A chemico-thermal vapor process of welding nickel or nickel-alloy objects together with iron or iron-alloy welding metal, the process comprising: treating the welding metal in a hydrochloric acid solution to form ferric chloride; placing said objects and said treated welding metal in an enclosure; and heating said enclosure to vaporize the ferric chloride and to decompose the resulting vapor, whereby the iron goes into solid solution to alloy with the nickel or nickel-alloy and form the weld, the chlorine being set free to return and again combine with the welding metal and form more ferric chloride in a repetition of the cycle.

14. A chemico-thermal vapor process of welding together adjacent metallic objects, which comprises: contacting the surface of said objects when in a heated condition with a vapor of a compound of a welding metal or metalloid containing a metal radical capable of alloying with said objects; and continuing the process until said objects are united.

15. A chemico-thermal vapor process of welding together adjacent metallic objects, comprising: contacting the surface of said bodies when in a heated condition with atoms of the welding metal or metalloid, said welding metal or metalloid being of higher atomic volume than the metal or metalloid to be welded.

16. A chemico-thermal vapor process of welding together adjacent metallic objects, comprising: contacting the surface of said bodies when in a heated condition with atoms of the welding metal or metalloid derived from the decomposition of a compound of said welding metal or metalloid, said welding metal or metalloid being of higher atomic volume than the metal or metalloid to be welded.

In testimony whereof, we have hereunto set our hands at Los Angeles, California, this 28th day of December, 1928.

BRUCE BURNS.
HOWARD B. LEWIS.
RUSSELL M. OTIS.